(12) United States Patent
Huber et al.

(10) Patent No.: US 6,866,862 B2
(45) Date of Patent: *Mar. 15, 2005

(54) ANIMAL FEEDS INCLUDING HEARTWORM-PREVENTION DRUGS

(75) Inventors: Gordon R. Huber, Sabetha, KS (US); David R. Jones, Palm Beach, FL (US); John C. Kuenzi, Bern, KS (US); Kevin D. Kuenzi, Perry, KS (US); Francisco A. Cabrera, Overland Park, KS (US)

(73) Assignee: Rubicon Scientific, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/971,520

(22) Filed: Oct. 5, 2001

(65) Prior Publication Data

US 2003/0099688 A1 May 29, 2003

(51) Int. Cl.⁷ .............................................. A61K 47/00
(52) U.S. Cl. ........................ 424/439; 514/460; 426/2; 426/630; 426/635; 426/516
(58) Field of Search ........................ 514/460; 424/439; 426/2, 630, 635, 516

(56) References Cited

U.S. PATENT DOCUMENTS

| | | |
|---|---|---|
| 721,633 A | 2/1903 | Eaton |
| 1,204,551 A | 11/1916 | Edgerton |
| 1,244,141 A | 10/1917 | Sterling |
| 2,742,394 A | 4/1956 | Davis et al. |
| 2,868,692 A | 1/1959 | Bach et al. |
| 2,893,914 A | 7/1959 | McCowen et al. |
| 3,005,753 A | 10/1961 | Vierling |
| 3,380,832 A | 4/1968 | Bone |
| 3,553,313 A | 1/1971 | Tort |
| 3,557,284 A | 1/1971 | Wilhelm et al. |
| 3,617,299 A | 11/1971 | Mattoon et al. |
| 3,686,392 A | 8/1972 | Hamada et al. |
| 3,696,189 A | 10/1972 | Snyder |
| 3,765,902 A | 10/1973 | Charter |
| 3,829,564 A | 8/1974 | Merry et al. |
| 3,857,968 A | 12/1974 | Haas et al. |
| 3,883,672 A | 5/1975 | Bone et al. |
| 3,908,025 A | 9/1975 | Miller et al. |
| 4,046,753 A | 9/1977 | Fisher et al. |
| 4,094,976 A | 6/1978 | Dybas et al. |
| 4,118,512 A | 10/1978 | Eichelburg |
| 4,199,569 A * | 4/1980 | Chabala et al. ............. 424/180 |
| 4,265,913 A | 5/1981 | Eichelburg |
| 4,348,379 A | 9/1982 | Kowalsky et al. |
| 4,643,908 A | 2/1987 | Sawhill |
| 4,713,245 A | 12/1987 | Ando et al. |
| 4,808,412 A | 2/1989 | Smith et al. |
| 4,842,862 A | 6/1989 | Jacobs et al. |
| 4,857,333 A | 8/1989 | Harold |
| 4,861,586 A | 8/1989 | Schneider et al. |
| 4,869,907 A | 9/1989 | Sasagawa |
| 4,880,632 A | 11/1989 | Lipham et al. |
| 4,948,589 A | 8/1990 | Iijima et al. |
| 4,960,589 A | 10/1990 | Sasagawa |
| 4,975,270 A | 12/1990 | Kehoe |
| 4,994,496 A | 2/1991 | Repasky et al. |
| 4,996,055 A | 2/1991 | Kurasawa |
| 5,000,940 A | 3/1991 | Staples et al. |
| 5,000,973 A | 3/1991 | Scaglione et al. |
| 5,006,341 A | 4/1991 | Davis et al. |
| 5,015,485 A | 5/1991 | Scaglione et al. |
| 5,041,452 A | 8/1991 | White |
| 5,089,271 A | 2/1992 | Imamgst |
| 5,094,870 A | 3/1992 | Scaglione et al. |
| 5,104,662 A | 4/1992 | Kalsta et al. |
| 5,152,986 A | 10/1992 | Lange et al. |
| 5,169,634 A | 12/1992 | Ellingsen et al. |

(List continued on next page.)

FOREIGN PATENT DOCUMENTS

WO        WO 0072698        12/2000

OTHER PUBLICATIONS

Lewis, B P et al; Veterinary Drug Index; 1982; p 25.
Merck & Co; The Merck Veterinary Manual; 1979; p 1559.
Kirk, Robert W. et al; Handbook of Veterinary Procedures and Emergency Treatment; 1975; p 553.
Lewis, Lon D. et al; Small Animal Clinical Nutrition; 1984; pp. 13–5; 13–8; 13–9; 13–12; A2–9, A2–11–A2–14.
Hills; Science Diet Dog Food Maximum Stress Diet Medicated Label; 1985; Stock No. 4180.
Morris, Mark L PhD; Nutritional Management in Gastrointestinal Disorders; Veterinary Clinics of North America—vol. 1, No. 1; 1972; pp. 65; 74–77.
Morris, Mark L. et al; Dietary Management of Chronic Renal Failure in Dogs; Canine Practice vol. 5, No. 1; Feb. 1978 p. 48.
Morris, Mark L. et al; Diet and Canine Urolithiasis; Canine Practice vol. 5, No. 4; Aug. 1978; p. 53.
Morris, Mark L. PhD; Feline Dietetics; Feline Practice; Nov.–Dec. 1975; p. 39.
Twin Screw Advances; Petfood Industry; Mar./Apr. 1999.
Edited by Fox, P.F.; Developments in Dairy Chemistry–4; Functional Milk Proteins; 1989; Contents of vols. 2 and 3;pp. v; 230–231; 242–243.
Morris, Mark DVM; Small Animal Clinical Nutrition; 1984; pp. A2–12 thru 14; A3–1.

*Primary Examiner*—Phyllis G. Spivack
*Assistant Examiner*—C. Delacroix-Muirheid

(57) ABSTRACT

Improved daily ration mammal feeds are provided which include minor amounts of heartworm preventative drugs, ensure that a mammal consuming the feed receives quantities of drug sufficient to establish and maintain substantially constant concentrations of the drug in the pet's bloodstream. The feeds may be produced by extrusion with addition of minor quantities of heartworm preventative drug so as to uniformly distribute the drug throughout the extruded product. Ivermectin levels of from about 2–1500 μg/kg of extruded feed are preferred.

21 Claims, No Drawings

U.S. PATENT DOCUMENTS

| | | |
|---|---|---|
| 5,206,025 A | 4/1993 | Courteille et al. |
| 5,208,034 A | 5/1993 | Herting et al. |
| 5,281,584 A | 1/1994 | Tobey |
| 5,314,692 A | 5/1994 | Haarasilta et al. |
| 5,316,769 A | 5/1994 | Nakano et al. |
| 5,316,770 A | 5/1994 | Edwards, Jr. |
| 5,320,849 A | 6/1994 | Hagiwara et al. |
| 5,378,471 A | 1/1995 | Smith |
| 5,393,333 A | 2/1995 | Trouve |
| 5,405,836 A | 4/1995 | Richar et al. |
| 5,407,661 A | 4/1995 | Simone et al. |
| 5,439,924 A | 8/1995 | Miller |
| 5,516,525 A | 5/1996 | Edwards, Jr. |
| 5,540,932 A | 7/1996 | Lanter et al. |
| 5,550,153 A * | 8/1996 | Kerz ..................... 514/460 |
| 5,578,585 A | 11/1996 | Matous et al. |
| 5,589,187 A | 12/1996 | Wentworth et al. |
| 5,603,945 A | 2/1997 | Isobe et al. |
| 5,676,966 A | 10/1997 | Kitamura et al. |
| 5,686,111 A | 11/1997 | Jalbert |
| 5,695,794 A | 12/1997 | Stark et al. |
| 5,720,971 A | 2/1998 | Beauchemin et al. |
| 5,725,865 A | 3/1998 | Mane et al. |
| 5,725,873 A | 3/1998 | Cook et al. |
| 5,728,398 A | 3/1998 | Onishi et al. |
| 5,738,866 A | 4/1998 | Lanter et al. |
| 5,747,063 A | 5/1998 | Languet et al. |
| 5,750,135 A | 5/1998 | Schleicher et al. |
| 5,753,223 A | 5/1998 | Shibahara et al. |
| 5,756,088 A | 5/1998 | Matsuura et al. |
| 5,756,719 A | 5/1998 | Chaundy et al. |
| 5,767,107 A | 6/1998 | Chaundy et al. |
| 5,770,217 A | 6/1998 | Kutilek, III et al. |
| 5,776,982 A * | 7/1998 | Potter et al. ................ 514/594 |
| 5,780,046 A | 7/1998 | Humber et al. |
| 5,792,470 A | 8/1998 | Baumgardner, Sr. |
| 5,795,585 A | 8/1998 | Ikeda et al. |
| 5,840,860 A | 11/1998 | Annison et al. |
| 5,843,922 A | 12/1998 | Whistler et al. |
| 5,853,757 A | 12/1998 | Durand et al. |
| 5,894,029 A | 4/1999 | Brown et al. |
| 5,904,928 A | 5/1999 | Cyr et al. |
| 5,908,634 A | 6/1999 | Kemp et al. |
| 5,919,451 A | 7/1999 | Cook et al. |
| 5,919,499 A | 7/1999 | Lawley |
| 5,922,692 A | 7/1999 | Marino |
| 5,948,431 A | 9/1999 | Lavery |
| 5,958,977 A | 9/1999 | Ikeda et al. |
| 5,962,043 A | 10/1999 | Jones et al. |
| 5,989,600 A | 11/1999 | Nielsen et al. |
| 6,001,384 A | 12/1999 | Jeannin |
| 6,004,576 A | 12/1999 | Weaver et al. |
| 6,004,585 A | 12/1999 | Grofmeyer et al. |
| 6,017,530 A | 1/2000 | Beudeker et al. |
| 6,022,555 A | 2/2000 | DeLuca et al. |
| 6,030,637 A | 2/2000 | Whitehead |
| 6,045,819 A | 4/2000 | Takebe |
| 6,048,543 A | 4/2000 | Schneider et al. |
| 6,077,525 A | 6/2000 | Vanderhoek |
| 6,080,419 A | 6/2000 | Stookey |
| 6,110,511 A | 8/2000 | Rollins et al. |
| 6,117,477 A | 9/2000 | Paluch |
| 6,716,448 B2 * | 4/2004 | Huber et al. ................ 424/442 |

* cited by examiner

ANIMAL FEEDS INCLUDING HEARTWORM-PREVENTION DRUGS

BACKGROUND OF THE INVENTION

1. Field of the Invention

The present invention is broadly concerned with improved daily ration feed products for animals subject to heartworm infection including minor amounts of a heartworm preventative drug. More particularly, the invention is concerned with such feed products, and methods of preparing and using the products, wherein the feeds contain a sufficient quantity of a heartworm preventative drug so that when the animals consume the feeds, therapeutically effective amounts of the drug are established and maintained in the bloodstreams of the animals. In this way, conventional dosing regimes are eliminated, and the animals receive proper quantities of drug as a part of their normal daily diets.

2. Description of the Prior Art

Heartworm infection is an endemic condition with certain animals, and especially household pets such as cats and dogs. A number of drugs have been developed for the treatment of heartworm infection, such as the avermectins, which are a class of macrocyclic lactones. Drugs of this class include ivermectin, celamectin, moxidectin, milbemycin oxine and eprinomectin.

Ivermectin is a known oral and injectable medication used as a wormer, heartworm preventative and to kill certain mites (mange). Ivermectin is a mixture of (10E,14E,16E, 22Z)-(1R,4S,5'S,6S,6'R,8R,12S,13S,20R,21R,24S)-6'-[(S)-sec-butyl]-21,24-dihydroxy-5',11,13,22-tetramethyl-2-oxo-(3,7,19-trioxatetracyclo[15.6.1.1$^{4,8}$.0$^{20,24}$]pentacosa-10,14, 16,22-tetraene)-6-spiro-2'-(perhydropyran)-12-yl 2,6-dideoxy-4-O-(2,6-dideoxy-3-O-methyl-αa-L-arabino-hexopyranosyl)-3-O-methyl-αa-L-arabino-hexopyranoside and (10E,14E,16E,22Z)-(1R,4S,5'S,6S,6'R,8R,12S,13S, 20R,21R,24S)-21,24-dihydroxy-6'-isopropyl-5',11,13,22-tetramethyl-2-oxo-(3,7,19-trioxatetracyclo[15.6.1.1$^{4,8}$.0$^{20,24}$]pentacosa-10,14,16,22-tetraene)-6-spiro-2'-(perhydropyran)-12-yl2,6-dideoxy-4-O-(2,6-dideoxy-3-O-methyl-αa-L-arabino-hexopyranosyl)-3-O-methyl-αa-L-arabino-hexopyranoside CAS: 70288-86-7.

Selamectin is identified as (5Z,25S)-25-cyclohexyl-4'-O-de(2,6-dideoxy-3-O-methyl-αa-L-arabino-hexopyranosyl)-5-demethoxy-25-de(1-methylpropyl)-22,23-dihydro-5-(hydroxyimino)avermectin A$_{1a}$.

Moxidectin is SPIRO[11,15-METHANO-2H,13H,17H-FURO[4,3,2-PQ][2,6]-B ENZODIOXACYCLO-OCTADECIN-13,2'[2H]PYRAN-17-ONE]-6'-[1,3-DIMETHYL-1-BUTENYL]-3',4',5',6,6',7,10,11,14,15,17a, 20,20a,20b-DIHYDRO-4'-[METHOXYIMINO]-5',6,6,19-TETRAMETHYL-[6R-2aE,4E,4'E,5'S*,6R*,6'S*(E),8E, 11R* 13R*,15S*,17aR*, 20R*,20aR*,20bS*]].

Milbemycin Oxime consists of the oxime derivatives of 5-didehydromilbemycins in the ratio of approximately 80% A4 (C32H45N07, MW 555.71) and 20% A3 (C31H43N07).

Eprinomectin is 4"-epiacetylamino-4"-deoxyavermectin B$_1$

These drugs are conventionally provided in tablet form or for larger animals as pastes and injectable liquids. Generally, animals are treated with relatively large doses of these drugs on a periodic basis. In the case of dogs and cats, tablets/chewables are given once a month by mouth year round for heartworm prevention. Higher doses are used to eliminate other parasites.

Ivermectin is the most commonly used heartworm preventative drug in domestic pets, and is generally considered safe at recommended dosage levels. If these are exceeded, side effects such as tremors, staggering, dilated pupils, loss of body weight or death may occur. As a consequence of normal dosing regimes for ivermectin, the treated animals necessarily receive a relatively large quantity of the drug which is to remain effective for an extended period. This in turn means that shortly after treatment the animal has a very high concentration of ivermectin in its bloodstream, with this concentration tailing off during the remainder of the period. This is to be contrasted with a more preferable treatment protocol wherein a substantially constant level of ivermectin is maintained on a continuing basis.

By the same token, the other established heartworm preventative drugs are generally administered in the same fashion as ivermectin, i.e., a relatively large quantity of the drugs are given at intervals, rather than daily administration of the drug to achieve a maintenance level in the animal's bloodstream.

U.S. Pat. No. 6,190,591 describes a single-extruder process for the production of controlled release particles which may be tableted. Various encapsulants including pharmaceuticals, nutraceuticals, nutritional compounds, biologically active components, flavorants, fragrances, detergents and surface-active compositions are described, at relatively large quantities in the particles of at least 1% and preferably from about 3-50%. Hence, the '591 patent is not concerned with complete feeds, but rather encapsulant particles. The process described in this patent make use of an elongated extruder where water and lipid are successively injected into the barrel, followed by water evaporation from the barrel and final addition of encapsulants. Such equipment is generally not suited to the production of a daily ration feed or similar product, given the need to uniformly distribute an active in the latter type of product.

There is accordingly a need in the art for improved feeds and methods of providing heartworm preventative drugs to animals in a manner which will avoid periodic, relatively large ivermectin doses and maintain a substantially constant level of ivermectin in the bloodstreams of the treated animals.

SUMMARY OF THE INVENTION

The present invention overcomes the problems outlined above and provides improved heartworm preventative drug-containing daily ration feed products for animals subject to heartworm infection such as cats and dogs, and methods of preparing and using such feeds. Generally speaking, a wide variety of feed types can be improved in accordance with the invention, e.g., extrusion-processed feeds of either dry or semi-moist kind, canned/retorted feeds or fresh refrigerated feeds. When the feeds are produced by extrusion they contain respective quantities of protein, fat and starch, together with a relatively minor amount of a desired heartworm preventative drug. Similarly, with canned or similar products a desired heartworm preventative drug is mixed with the solid and/or liquid fractions thereof to the desired therapeutic level. In all cases, however, it is preferred that the potency of the drug content of the feeds be maintained for at least six months at ambient temperature storage, and more preferably nine months at ambient temperature storage.

Through use of the feed products of the invention, an animal consuming the feeds on a daily basis receives a maintenance quantity of the drug, so that the therapeutic effects thereof are realized. Normally, the drug should be present in the extruded feeds at a level of at least about 2 µg/kg of feed product, more preferably from about 2–1500 µg/kg of feed product, and most preferably from about 5–1000 µg/kg of feed product, although specific drug amounts may vary depending upon the particular drug chosen. In other products within the ambit of the invention, the drug(s) may be present at a level of up to about 0.75% by weight, more preferably up to about 0.5% by weight, and still more preferably up to about 0.1% by weight, based upon the total weight of he feeds taken as 100%.

As noted, a wide variety of extruded feeds can be used in the context of the invention. For example, typical dry extruded product having a moisture content of less than about 10% by weight can be produced with added heartworm preventative drug. Similarly, semi-moist feeds having a moisture content on the order of 15–30% by weight are also suitable. In extruded feeds of these types, it is preferred that the drug content be substantially uniformly dispersed throughout the feed. Alternately, pillow-type feeds can be produced having a soft, flowable matrix center surrounded by a shell of self-sustaining feed material; in such a case, the drug content may be present only in the soft center matrix. In most cases, the extruded feed products of the invention should contain from about 5–15% by weight moisture (wet basis), 15–30% by weight protein, more preferably from about 18–25% by weight protein; from about 3–24% by weight fat, more preferably from about 5–20% by weight fat; and from about 5–80% by weight starch, more preferably from about 20–50% by weight starch. Generally, the extruded feeds should have a bulk density of from about 30–700 g/l, more preferably from about 140–400 g/l, and a water activity of from about 0.1–0.99, more preferably from about 0.6–0.75.

An important goal of the invention is to provide heartworm preventative drug-containing daily ration feeds which when consumed on a daily basis by animals will establish and maintain a therapeutic amount of ivermectin in the bloodstreams of the animals. In this way, the need for periodic dosing with relatively large amounts of drug(s) is completely avoided, yet the beneficial effects of the drug remain. To this end, the feeds should have sufficient heartworm preventative drug therein so that, when a domesticated household pet consumes the feed at a rate of from about 10–40 g of the feed per kg of the consuming pet's weight, the desired therapeutic amount of drug is achieved.

During extrusion processing in accordance with the invention, starting farinaceous feed ingredients are fed into the elongated barrel of an extruder including at least one elongated, axially rotatable, helically flighted screw with an endmost extrusion die. During passage through the extruder barrel, the ingredients are subjected to elevated temperature, agitation and shear in order to cook the product. In preferred forms of the invention, the starting ingredients are first preconditioned prior to passage into the extruder barrel. Generally, during preconditioning the starting mixture is subjected to a temperature of from about 20–98° C. (more preferably from about 90–97° C.) for a period of from about 15–600 seconds (more preferably from about 170–190 seconds). The purpose of preconditioning is to initially moisturize and partially cook the starting material prior to entrance thereof into the extruder barrel. Advantageously, the material leaving the preconditioner has a moisture content of from about 10–60% by weight, and more preferably from about 21–23% by weight.

In the extruder, the preconditioned starting material is subjected to conditions of elevated heat, pressure and shear. Normally, the temperature conditions in the barrel are such as to achieve a maximum temperature of from about 20°–175° C., and more preferably from about 65–120° F. Normal maximum pressure conditions are from about 100–500 psi, and more preferably from about 150–300 psi. Residence times in the extruder barrel usually range from about 3–180 seconds, and more preferably from about 20–40 seconds.

The heartworm preventative drug content of the extruded feeds can be added at a variety of locations during the process. One preferred technique is to prepare a dilute drug solution which can be pumped at a known rate into the farinaceous ingredients during processing. For example, the drug liquid may be added at the preconditioner, preferably adjacent the outlet thereof. Alternately, the drug may be injected directly into the extruder barrel during processing. Given the relatively small quantities of drug employed in the feeds, it is generally important that there be sufficient time in the process to adequately mix in the drug substantially uniformly throughout the other ingredients.

DETAILED DESCRIPTION OF THE PREFERRED EMBODIMENTS

The following examples set forth presently preferred methods for the production of heartworm preventative drug-containing pet foods and related information. It is to be understood, however, that these examples are provided by way of illustration and nothing therein should be taken as a limitation upon the overall scope of the invention.

EXAMPLE 1

In this example, an ivermectin-containing dog food product was produced using a co-extrusion process. The dry farinaceous ingredients used in this example were (all percentages on a weight basis): wheat flour—14%; rice flour—15%; corn flour—32%; corn gluten meal—12%; poultry meal—8%; brewer's yeast—2%; sodium bicarbonate—0.6%; Thoxyquin—0.1%; potassium sorbate—0.3%; and sugar—5%. The liquid co-extruded mixture contained (all percentages on a weight basis: poultry fat—81.13%; GP (Glutamine Peptide)—11.32%; cheese powder—3.77%; and poultry meal—3.77%.

The extrusion equipment included a Wenger X-85 single screw extruder with a Wenger Model 7 DDC preconditioner. The extruder barrel was made up of a series of interconnected heads. The screw configuration, dies, adaptor parts, preconditioner shafts and beater elements were all Wenger equipment.

In order to effect the desired co-extrusion, a delivery pipe having approximately a ⅜" delivery nipple was inserted into the center of the die so that the liquid portion was directed through the die with a surrounding annulus of the extruded farinaceous mixture. The liquid portion was pumped through the delivery pipe at a rate which was approximately 30% of the extrusion rate of the farinaceous mixture. At the outlet of the extruder die, the product was cut using an knife and respective samples of the cut product were manually crimped using a hand-crimping tool. In this fashion, "pillows" of the pet food were obtained, with an outer farinaceous ingredient shell and an inner flowable filling containing ivermectin.

Following this treatment, the product was dried to a moisture level of less than 10% by weight. Three samples from the dryer were subsequently frozen and another sample was placed in a plastic bag and stored at room temperature, for a period in excess of six months.

The following table sets forth the illustrative preconditioning and extrusion information.

TABLE 1

| DRY RECIPE INFORMATION | | |
|---|---|---|
| Dry Recipe Rate | kg/hr | 93 |
| Feed Screw Speed | rpm | 11 |
| PRECONDITIONING INFORMATION | | |
| Preconditioner Speed | rpm | 485 |
| Steam Flow to Preconditioner | kg/hr | 8 |
| Water Flow to Preconditioner | kg/hr | 21 |
| Preconditioner Discharge Temp. | ° C. | 66 |
| EXTRUSION INFORMATION | | |
| Extruder Shaft Speed | rpm | 516 |
| Extruder Motor Load | % | 75 |
| Control/Temperature 2nd Head | ° C. | 40 |
| Control/Temperature 3rd Head | ° C. | 51 |
| Control/Temperature 4th Head | ° C. | 39 |
| Control/Temperature 5th Head | ° C. | 48 |
| Control/Temperature 7th Head | ° C. | 45 |
| FINAL PRODUCT INFORMATION | | |
| Extruder Discharge Density | kg/m$^3$ | 350 |

The products resulting from this test were analyzed to determine the content of ivermectin in the samples. In this analysis, each feed sample was ground in a Retsch mill at low speed using a 2 mm grating screen, so that the ground material would pass through a #10 mesh screen. A total of six samples, three frozen and three stored at room temperature, were processed. In each case, three 37.5 g of a sample was placed in a 250 ml bottle and 100 ml of methanol was added. The bottle was capped, the sample was sonicated for 20 minutes and shaken for 1 hour. 40 ml of the extract was added to a centrifuge tube and centrifuged for 5 minutes at 2000 rpm. 20 ml of the supernatant solution was then passed through a alumina column. The first five ml was rejected and the remainder of the liquid through the column was collected as a purified sample. 2 ml of the purified sample was mixed with a 5 ml mixture of acetonitrile:water (1:1), and a solid phase extraction (SPE) was performed in accordance with the procedure described in Doherty et al., *Analytical Chemists International*, 81:869(4)(1998). 2 ml of the working, 1% ivermectin sample standard was also run through the SPE procedure to determine if any loss of ivermectin was taking place.

All samples from the SPE treatment were evaporated under nitrogen using an analytical evaporator with a water bath temperature of 50° C. The dried samples were reconstituted in 2 ml of HPLC mobile phase for analysis. Two samples were also prepared using 2 ml of the working standard ivermectin solution (containing 0.42 µg/ml) and were run before and after the feed samples.

The HPLC setup consisted of the following:

Gilson 712 HPLC System Controller

Gilson 305 pump, 231 sample injector, 401 dilutor and 115 UV detector

Jones Chromatography column heater set at 30° C.

| | |
|---|---|
| HPLC Analytical column | Symmetry C$_{18}$, 5µ 4.6 × 350 mm |
| Mobile Phase | Acetonitrile/methanol/water 53/35/7 |
| Flow rate | 1 mL/minute |
| UV Detection | 245 nm |

The results of the HPLC analyses (two injections of each feed sample and two injections of the working standard solution) confirmed that the pet food samples contained very close to the expected content (0.42 µg/kg) of ivermectin. In particular, the average ivermectin content of the three frozen and the ambient-stored samples was 0.43 µg/kg. This demonstrated that storage conditions (frozen versus ambient) had little effect upon ivermectin potency, and an excellent ivermectin stability.

EXAMPLE 2

In this example, an ivermectin-containing dog food was prepared using a Wenger TX-85 twin screw extruder equipped with a Model 16 Wenger DDC preconditioner. The dry ingredients fed to the extruder included (all percentages by weight basis): wheat middlings—18%; meat and bone meal—18%; soybean meal—18%; and corn—46%. In this run, two liquid dispersions were used which contained (all percentages by weight basis): first mixture, propylene glycol—11 lbs and water—11 lbs; second mixture, propylene glycol—48.82%; water—48.82%; red No. 40 dye—1.86%; and ivermectin solution—0.50%. The amount of ivermectin used was calculated to provide a dose of approximately 1121.1 µg of ivermectin per kg of the dog food on a dry basis. The extruder barrel was made up of interconnected heads. The rotating elements within the barrel included extruder shafts and other elements. The extruder was equipped with dies and adaptors, inserts, and a cutting knife with knife blades was used. The foregoing components as well as the preconditioners shafts and beater elements were all Wenger equipment.

In the process, the dry ingredients were fed to the preconditioner where steam and water was added to moisturize and partially precook the mixture. This preconditioned material was then fed to the inlet of the extruder in the usual fashion. The first liquid mixture was added to the outlet end of the preconditioner for passage into the extruder barrel along with the preconditioned material, over a period of about 11 minutes. Thereafter, the colored, ivermectin-containing liquid mixture was added over a period of about 22 minutes. Finally, additional quantities of the first water/propylene glycol liquid mixture was again added, over about 11 minutes. After extrusion, the product was dried in a Wenger dryer operating at 115° C., followed by a cooler pass. The dryer discharge moisture was 6.25%, wb.

Samples were collected of the colored ivermectin-containing dispersion, the raw material mixture, preconditioned material leaving the preconditioner and extruded samples.

The following table sets forth illustrative preconditioning and extrusion conditions.

TABLE 2

| DRY RECIPE INFORMATION | | |
|---|---|---|
| Dry Recipe Moisture | % wb | 9.56 |
| Dry Recipe Density | kg/m$^3$ | 570 |
| Dry Recipe Rate | kg/hr | 2618 |
| Feed Screw Speed | rpm | 205 |
| PRECONDITIONING INFORMATION | | |
| Preconditioner Speed | rpm | 250 |
| Steam Flow to Preconditioner | kg/hr | 224 |
| Water Flow to Preconditioner | kg/hr | 362 |
| Preconditioner Additive 1 Rate | kg/hr | 57 |
| Preconditioner Discharge Temp. | ° C. | 90 |
| EXTRUSION INFORMATION | | |
| Extruder Shaft Speed | rpm | 700 |
| Extruder Motor Load | % | 67 |
| Steam Flow to Extruder | kg/hr | 84 |
| Water Flow to Extruder | kg/hr | 112 |
| Control/Temperature 1st Head | ° C. | 50/57 |
| Control/Temperature 2nd Head | ° C. | 50/86 |
| Control/Temperature 3rd Head | ° C. | 40/52 |
| Control/Temperature 4th Head | ° C. | 40/75 |
| Head/Pressure | kPa | 900 |
| Knife Drive Speed | rpm | 905 |

TABLE 2-continued

FINAL PRODUCT INFORMATION

| | | |
|---|---|---|
| Extruder Discharge Density | kg/m³ | 368 |
| Extruder Performance | | Stable |

The dog food from this run was fed ad libitum to an intact female mixed breed dog weighing about 10 kg. On day 7, blood was drawn from the dog four hours after eating and stored in an anti-coagulant tube with calcium EDTA in a refrigerator. Seven days later, the same dog was again fed the ivermectin-containing feed ad libitum and blood was collected four hours post-feeding. This sample was also refrigerated in the same fashion as the first sample.

The blood samples were then analyzed to determine the content of ivermectin therein, using HPLC. The procedure used was described in Dickinson, *Journal of Chromatography*, 58:250–257 (1990). In this procedure, 0.5 ml of each blood sample was purified using solid phase extraction (SPE) cartridges and dissolved in a small volume of mobile phase for injection onto the HPLC column. The method has a limit of detection of about 2 ng/ml and uses an internal standard. After preparation of the internal standard, a standard curve is constructed using ivermectin-spiked blood samples. A known 1% ivermectin sample was used as the primary standard.

The blood samples from the dog were then analyzed for ivermectin content with HPLC peak heights corrected using the internal standard. The HPLC setup consisted of the following:

Gilson 712 HPLC System Controller
Gilson 305 pump, 231 sample injector, 401 dilutor and 115 UV detector
Jones Chromatography column heater set at 56° C.

| | |
|---|---|
| HPLC Analytical column: | Coulter-Beckman UltraSphere XL $C_{18}$, 3µ, 4.6 × 70 mm |
| Mobile Phase: | Acetonitrile/methanol/water 49/33/18 |
| Flow Rate: | 1 mL/minute |
| UV Detection: | 245 nm |

The results of this study demonstrated that the dog blood samples contained ivermectin in the range of about 5–8 ng/ml.

EXAMPLE 3

In this example a series of extrusion runs were performed to determine the consistency of metering of ivermectin into a dog food mixture during extrusion. In each case, the farinaceous mixture included the following ingredients (all percentages on a weight basis): corn—35.93%; poultry meal—28.94%; rice—22.95%; corn gluten meal—11.98%; vitamin premix—0.10%; and mineral premix—0.10%. Three ivermectin-containing liquids were prepared, containing: Recipe #1, propylene glycol—8.60 pounds; water—8.60 pounds; red #40 dye—160 grams; ivermectin solution—0.212 ml; Recipe #2, propylene glycol—8.60 pounds; water—8.60 pounds; red #40 dye—160 grams; ivermectin solution—0.433 ml; Recipe #3, propylene glycol—8.60 pounds; water—8.60 pounds; red #40 dye—160 grams; ivermectin solution—1.279 ml. In each run 8.0 kg of a respective ivermectin recipe was added to the farinaceous ingredients at the exit of the preconditioner, prior to entering the extruder barrel. The recipes were added at a rate equal to 2% of the farinaceous mixture rate. The target for the runs using Recipe #1 was 6 µg ivermectin/kg of feed; for runs using Recipe #2, 12 µg/kg; and for runs using Recipe #3, 36 µg/kg.

The extruder system employed was a Wenger model TX 57 twin screw extruder with a model 2 DDC preconditioner. The extruder barrel was equipped with an extrusion die, a knife assembly was used to cut extrudate.

The following table sets forth the preconditioning and extrusion information collected during this series of runs. In runs 101–103, Recipe #1 was used; in runs 104–106, Recipe #2 was used; and in runs 107–109, Recipe #3 was used. As the extrudates emerged from the die, they were cut using the knife assembly and dried in a Wenger multiple-pass drier. Samples were collected at 15 minutes, 30 minutes and 45 minutes from the preconditioner, extruder and drier.

TABLE 3

| | | 101 | 102 | 103 | 104 | 105 | 106 | 107 | 108 | 109 |
|---|---|---|---|---|---|---|---|---|---|---|
| DRY RECIPE INFORMATION: | | | | | | | | | | |
| Dry Recipe Density | kg/m³ | 494 | 494 | 494 | 494 | 494 | 494 | 494 | 494 | 494 |
| Dry Recipe Rate | kg/hr | 400 | 400 | 400 | 390 | 392 | 390 | 387 | 397 | 392 |
| Feed Screw Rate | rpm | 48 | 53 | 55 | 49 | 52 | 52 | 56 | 54 | 54 |
| PRECONDITIONING INFORMATION: | | | | | | | | | | |
| Preconditioner Speed | rpm | 350 | 350 | 350 | 350 | 350 | 350 | 350 | 350 | 350 |
| Steam Flow to Preconditioner | kg/hr | 36 | 35.8 | 35.9 | 36.1 | 35.9 | 35.8 | 36 | 36.1 | 35.9 |
| Water Flow to Preconditioner | kg/hr | 48 | 48.1 | 48.3 | T47.7 | 47.9 | 48.1 | 48 | 48.2 | 48.1 |
| Preconditioner Additive 1 Rate | kg/hr | 8 | 7.9 | 8.05 | 7.8 | 7.95 | 7.84 | 8.12 | 8.03 | 8.02 |
| Preconditioner Discharge Temp. | ° C. | 86 | 85 | 85 | 86 | 86 | 86 | 85 | 85 | 85 |
| Moisture Entering Extruder | % wb | 16.26 | 17.04 | 19.14 | 18.96 | 16.47 | 18.18 | 16.14 | 18.97 | 18.98 |
| EXTRUSION INFORMATION: | | | | | | | | | | |
| Extruder Shaft Speed | rpm | 426 | 427 | 425 | 427 | 426 | 426 | 426 | 426 | 425 |
| Extruder Motor Load | % | 53 | 45 | 61 | 54 | 52 | 67 | 49 | 51 | 52 |
| Steam Flow to Extruder | kg/hr | 12 | 13.1 | 709 | 8 | 7.9 | 8 | 8.1 | 8 | 8 |
| Water Flow to Extruder | kg/hr | 24 | 24 | 24.1 | 24 | 24 | 23.8 | 24 | 24 | 23.9 |
| Control/Temp. 1st Head | ° C. | 40/52 | 40/52 | 40/52 | 40/53 | 40/55 | 40/52 | 40/53 | 40/55 | 40/54 |
| Control/Temp. 2nd Head | ° C. | 60/60 | 60/60 | 60/59 | 60/60 | 60/60 | 60/59 | 60/59 | 60/59 | 60/60 |

TABLE 3-continued

|  |  | 101 | 102 | 103 | 104 | 105 | 106 | 107 | 108 | 109 |
|---|---|---|---|---|---|---|---|---|---|---|
| Control/Temp. 3rd Head | ° C. | 80/79 | 80/80 | 80/81 | 80/80 | 80/80 | 80/81 | 80/80 | 80/80 | 80/79 |
| Control/Temp. 4th Head | ° C. | 60/67 | 60/67 | 60/67 | 60/65 | 60/65 | 60/66 | 60/65 | 60/65 | 60/64 |
| Head/Pressure | kPa | 1710 | 1600 | 1980 | 1660 | 1770 | 1910 | 1960 | 1980 | 1830 |
| Knife Drive Speed | rpm | 1324 | 1324 | 1325 | 1492 | 1443 | 1493 | 1493 | 1492 | 1491 |
| FINAL PRODUCT INFORMATION: |  |  |  |  |  |  |  |  |  |  |
| Extruder Discharge Moisture | % wb | 20.43 | 19.79 | 20.4 | 21.32 | 21.46 | 21.97 | 22.12 | 22.83 | 22.71 |
| Extruder Discharge Density | kg/m$^3$ | 312 | 374 | 338 | 400 | 349 | 352 | 336 | 336 | 400 |
| Extruder Performance |  | Stable | Stable | Stable | Stable | Stable | Stable | Stable | Stable | Stable |
| Dried Product Moisture | % wb | 2.75 | 2.12 | 4.67 | 9.38 | 9.74 | 10.18 | 7.45 | 9.4 | 8.0 |

The dried samples were analyzed to determine ivermectin content, using the technique described in Example 1. The results from the Recipe #1, #2 and #3 runs were averaged, with the following results. For the Recipe #1 runs (101–103), the ivermectin content was 6.02 µ/kg (dry basis); for the Recipe #2 runs (104–106), the ivermectin content was 11.99 µg (dry basis); and for the Recipe #3 runs (107–109), the ivermectin content was 35.98 µ/g (dry basis). This confirms that the processing technique of this Example gives extremely close ivermectin contents, as compared with the pre-extrusion goals.

We claim:

1. A daily ration for domesticated household pets wherein said ration comprises an extruded feed product containing respective quantities of protein, fat and starch, said extruded product feed having a heartworm preventative drug co-extruded therein, said drug being present in an amount to establish and maintain therapeutically effective levels of said drug in the bloodstream of an animal consuming said feed.

2. The feed of claim 1, said drug being selected from the avermectin class of drugs.

3. The feed of claim 1, said extruded feed product selected from the group consisting of dry and semi-moist extruded feed products.

4. The feed of claim 1, said drug being present at a level so that, when a mammal consumes the feed at a daily rate of from about 10–40 g feed per kg of the animal's weight, a therapeutically effective amount of the drug is established and maintaine in the mammal's bloodstream.

5. A method of feeding a mammal subject to heartworm infection, comprising the steps of feeding the mammal on a daily basis a daily ration feed containing a quantity of a heartworm preventative drug co-extruded with said feed, said drug present in the ration so that a therapeutically effective amount of the drug is established and maintained in the mammal's bloodstream.

6. The method of claim 5, said drug being selected from the avermectin class of drugs.

7. The method of claim 5, said feed being an extruded feed product containing respective quantities of protein, fat and starch.

8. The method of claim 7, said extruded feed product selected from the group consisting of dry and semi-moist extruded feed products.

9. The method of claim 5, said drug being present at a level so that, when a mammal consumes the feed at a daily rate of from about 10–40 g feed per kg of the animal's weight, a therapeutically effective amount of the drug is established and maintain in the mammal's bloodstream.

10. In a method of producing an extruded daily ration feed product for animals including the steps of providing a mixture of ingredients including respective quantities of protein, fat and starch, passing said mixture into and through an elongated extruder barrel having an elongated, axially rotatable, helically flighted screw within the barrel and an endmost extrusion die in order to subject the mixture to elevated temperature, pressure and shear and thereby cook the mixture, the improvement which comprises the step of adding a quantity of a heartworm preventative drug to said mixture prior to passage thereof through said die, said quantity being sufficient to establish and maintain a therapeutically effective amount of said drug in the bloodstream of the animal consuming the daily ration feed.

11. The method of claim 10, including the step of initially passing said mixture through a preconditioner prior to passage thereof into and through said extruder, and, during said passage through the preconditioner, adding moisture to the mixture and elevating the temperature thereof to at least partially precook the mixture.

12. The method of claim 11, including the step of adding said drug into said preconditioner.

13. The method of claim 12, including the step of providing said drug in the form of a liquid, and injecting said liquid into said preconditioner adjacent the outlet thereof.

14. The method of claim 10, including the step of injecting said drug into the barrel of said extruder during passage of the material into and through the barrel.

15. The method of claim 10, including the step of adding sufficient drug to the mixture so that the extruded feed has from 2–1500 µg drug/kg of feed.

16. The method of claim 10, said drug being selected from the avermectin class of drugs.

17. The method of claim 16, said drug selected from the group consisting of ivermectin, celamectin, moxidectin, milbemycin oxine and eprinomectin, and mixtures thereof.

18. The feed of claim 1, said feed selected from the group consisting of canned and fresh refrigerated meats.

19. The feed of claim 1, said drug being present in said feed at level of from about 2–1500 µg per kilogram of feed.

20. The method of claim 5, said drug being present in said feed at level of up to about 1500 µg per kilogram of feed.

21. The method of claim 10, said drug being present in said feed at level of up to about 1500 µg per kilogram of feed.

* * * * *